Patented Apr. 2, 1929.

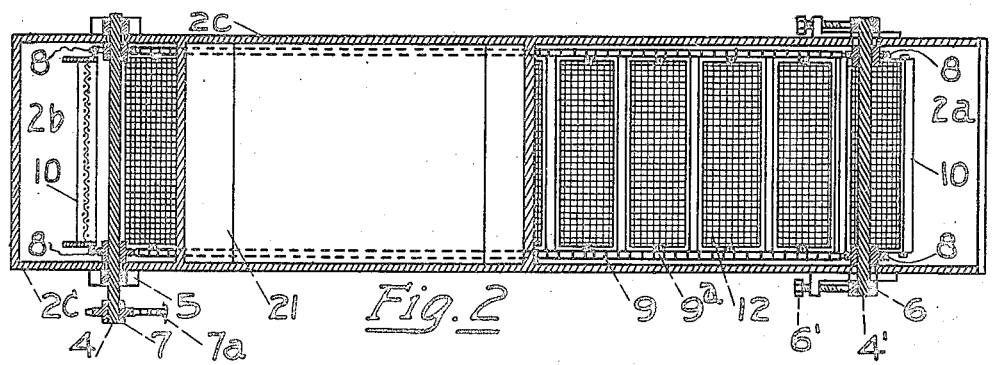
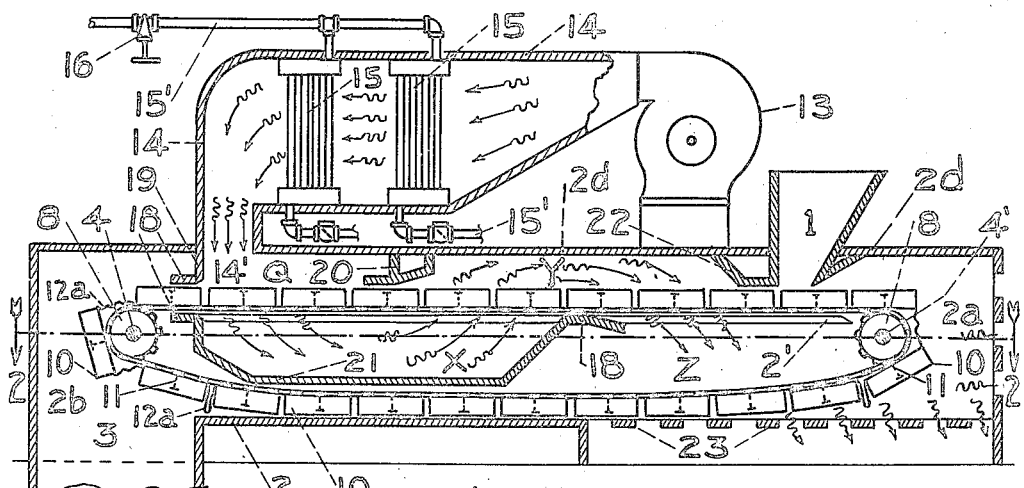
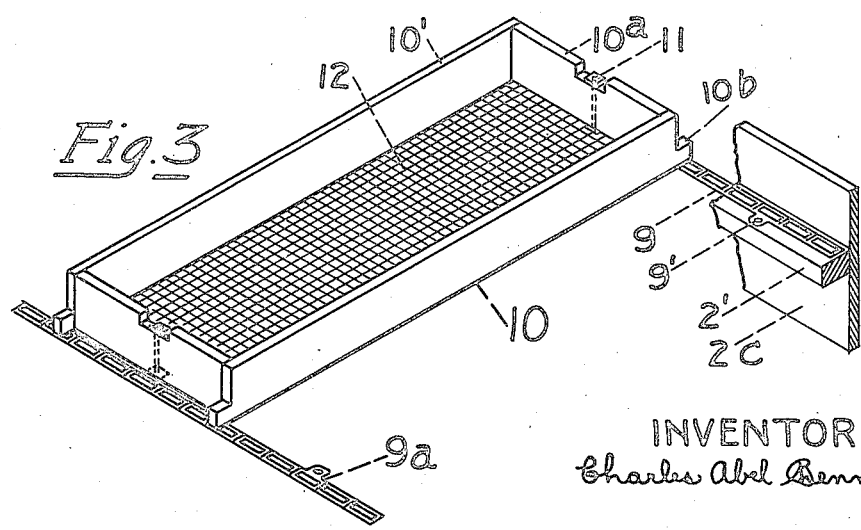

1,767,929

UNITED STATES PATENT OFFICE.

CHARLES ABEL BENNETT, OF TALLULAH, LOUISIANA, ASSIGNOR TO THE GOVERNMENT AND THE PEOPLE OF THE UNITED STATES OF AMERICA.

PROCESS AND APPARATUS FOR DRYING SEED COTTON.

Application filed March 22, 1928. Serial No. 263,810.

(GRANTED UNDER THE ACT OF MARCH 3, 1883, 22 STAT. L. 625.)

This application is made under the act of March 3, 1883, chapter 143 (22 Stat. 625) and the invention herein described and claimed, may be used by the Government of the United States or any of its officers or employees in the prosecution of work for the Government, or any person in the United States, without payment to me of any royalty thereon.

My invention relates to improvements in the method and apparatus for drying seed-cotton in which horizontally (or slightly inclined) traveling trays or baskets loaded with seed-cotton are subjected to currents of heated atmosphere at predetermined temperatures for predetermined lengths of time of exposure and in which process and apparatus predetermined volumes of the heated atmosphere are forced in paths or channels so as to penetrate a number of times through said tray loads and thereby secure any desired degree of dryness in the seed-cotton.

Seed-cotton is the raw cotton product harvested directly from the cotton plant, and is the original cotton product combining the seed and the lint or fibre together with such portions of the bolls, hulls and plant parts as may adhere to the seed-cotton during its picking or harvesting.

Seed-cotton is prepared for market by the general processes known as ginning, in which the lint or fibre of the cotton is separated from the cotton seed. After ginning the seed-cotton, the lint or fibre is baled and the seed is used for planting or for its milling products such as oil, meal and so forth.

Ginning of seed-cotton is difficult to accomplish unless the lint or fibre is sufficiently dry to pass through the cotton gins without mutilating or impairing the fibre, and the keeping qualities of both the fibre and the seed depend upon the moisture content therein.

In my research investigations as an employee of the United States Department of Agriculture, I have discovered the following general facts upon which my invention of a process and apparatus for drying seed-cotton are based. These basic facts relate to the general conditions encountered in the cotton growing regions of the United States of America and to the particular and fundamental requirements involved in the successful drying of damp seed-cotton. These facts and requirements are:

First, that when seed-cotton has a moisture content of more than fifteen percent of its total weight it will not gin smoothly or without impairment and mutilation of the cotton lint or fibre.

Second, that the preferable moisture content of the seed-cotton should be between ten percent and twelve percent of the total weight of the seed-cotton to secure the best results in ginning, storing and milling (of the seed).

Third, that the first gatherings of the cotton harvest are usually green and heavy in plant sap and moisture content; the mid-season gatherings are in good condition for ginning, usually, without need of drying; and the late season gatherings are liable to dampness from dews and rains. The first gatherings and the late gatherings of the seed-cotton are, therefore, principally involved in the needs for drying.

Fourth, for most successful drying of the seed-cotton without injury to its fibre and seed, a length of time of exposure varying from forty seconds to three minutes is required. A shorter period of exposure does not produce uniform drying, and a longer period of exposure may endanger both the fibre and the seed under the conditions of temperature involved.

Fifth, for the most successful drying of the seed-cotton without injury to the strength of the fibre or the germinating quality of the seed, an atmospheric temperature within the dryer of not to exceed two hundred degrees Fahrenheit is required. Such a temperature of the heated atmosphere or drying medium will not actually heat the seed above the danger limit of 175 degrees Fahr. because the period or length of time of exposure as limited in the above fourth essential does not permit of undue heating.

Sixth, for the most efficient drying of the seed-cotton, a definite volume of heated atmosphere is required for each pound of seed-cotton. This required volume of air per pound of seed-cotton is not constant, but depends upon the relative humidity of the external air and upon the temperature to which the heated atmosphere is raised before admission to the dryer. For drying one hundred pounds of damp seed-cotton per minute under the variable weather conditions of the Mississippi delta, and for removal of five percent of moisture in terms of the total weight of the seed-cotton, this volume of heated atmosphere ranges from forty cubic feet to one hundred cubic feet of heated atmosphere per pound of seed-cotton, all subject to the limiting conditions of exposure, temperature, etc., hereinbefore set forth.

The objects, therefore, of my invention are,—

First, to provide a continuous method and apparatus for drying seed-cotton in quantities commensurate with customary rates of delivery of seed-cotton to the cotton gins; second, to provide a successful drying process or cycle wherein the outgoing dryest seed-cotton is brought into contact with the incoming heated, dry atmosphere, and wherein the incoming damp seed-cotton is brought into contact with the discharging, cooler currents of heated atmosphere; third, to provide a horizontal or inclined type or style of seed-cotton dryer having simple means of controlling the features of exposure, temperature and atmospheric volume required in the drying process; fourth, to provide a seed-cotton dryer of simple construction which may be erected without special or complicated parts other than those which may be purchased in the open market; fifth, to provide an economical horizontal seed-cotton dryer which may be operated by one attendant; and sixth, to provide an efficient and practical seed-cotton drying method and apparatus whose product will "gin smoothly", irrespective of the initial variable conditions encountered in weather, season or seed-cotton.

I attain these objects by the seed-cotton drying method and apparatus illustrated in the accompanying drawing, in which—

Figure 1 is a vertical section of the entire apparatus (except fan and heater members);

Figure 2 is a plan cross-section of the apparatus as it appears on the section line 2—2 in Figure 1; and Figure 3 is an isometric view illustrating one kind of tray or basket construction together with practical means of attachment to conveyor chains and the manner of supporting the conveyor chains within the dryer cabinet.

Similar numerals refer to similar parts throughout the several views.

Referring to the drawings it will be seen that my dryer comprises a cabinet 2 having a cotton inlet 1 which may be an open hopper as shown, a continuation of cotton ducts from other cotton handling devices (not shown), or a closed chute fed through vacuum wheels currently used in cotton drying devices (not shown).

The dryer cabinet 2 resting on the floor may be either horizontal or set at an incline with the horizontal. The drawings apply to either position of installation.

The sides $2^c$ and the top $2^d$ of the cabinet 2 are fairly tightly constructed to eliminate atmospheric leaks. The cabinet 2 contains within itself the endless conveyor assembly consisting of shafts 4 4' rotating in the bearings 5 and 6 which are attached by suitable means to the sides $2^c$ of the cabinet 2.

The bearings 5 in which the shaft 4 rotates are preferably fixed in their position, the better to receive such power as may be communicated to said shaft 4 through sprocket or pulley 7 and chain or belt $7^a$ from any source of power such as a line shaft, engine or motor (not shown).

The bearings 6 in which the shaft 4' rotates are preferably adjustable by means of the take-up screw 6', whereby slack may be compensated for in the endless conveyor chains 9 which are carried upon the sprockets 8 secured to the shafts 4 and 4'.

Referring to Figure 2 wherein one simple type of conveyor construction is delineated, the endless conveyor chain 9 may be fitted with various attachments or links for securing the trays or baskets 10, such as the special link $9^a$ which is disposed at suitable intervals for fastening the basket ends $10^a$ to the ears or lugs 9' by means of the bolts or screws 11.

The trays or baskets 10 are constructed with the ends $10^a$, sides 10' and screened or perforated bottoms 12 which permit conveying of the seed-cotton without appreciable resistance to the penetrating currents of the drying medium from either top or bottom of the trays 10.

The sides 10' perform an important function in the operation of the dryer by completing the several baffled stages Q, X, Y, and Z by means of which the currents of the drying medium are confined to their proper paths or channels. By means of these tray sides 10', if the trays 10 are not completely filled with seed-cotton, the passage of the sides 10' beneath the baffles 19, 20 and 22 tend to confine the drying medium to its regular paths as indicated by the conventional ventilation arrows of Figure 1.

For plantation use, the endless conveyor chains 9 may be composed entirely of such special links as $9^a$, upon whose ears 9' may be mounted slats (not shown) with ample interstices between said slats for free passage of the drying medium through the conveyor assembly, and with upright division plates (not shown) or members disposed at suitable intervals upon the conveyor to function in the manner described for the tray sides 10'.

By these various methods of construction it will be seen that the endless conveyor assembly is of segmental construction peculiarly adaptable to the use of standard sprockets of any size in conjunction with standard chains and attachments such as links 9ᵃ and others (not shown).

By this use of an endless conveyor assembly composed substantially of segments, my invention eliminates those large drums and continuous unit aprons often employed in other dryers, thereby also eliminating the screen alignment devices which other dryers resort to, to say nothing of their breakage of screens due to bending around their drums, etc.

Balance of the tray 10 is achieved by means of the bolts or screws 11 which are preferably located centrally with respect to the tray ends 10ᵃ, and the extension lugs 10ᵇ at the ends of the sides 10′ permit the tray or basket to ride smoothly upon the upper run of the conveyor chain 9 as it travels from the cabinet end 2ᵃ to the cabinet end 2ᵇ between the baffled stages Z, Y, X, and Q. This said upper run of the conveyor chains 9 is supported for straight line travel by the chain-rail 2′ which is attached by suitable means to the inside faces of the sides 2ᶜ of the cabinet 2.

The fan 13 is used to supply the atmosphere to the cabinet 2 under a static pressure ranging from three to ten inches of water, travel of said atmosphere being substantially as indicated by the conventional ventilation arrows.

The fan 13 draws atmosphere either directly from the external, unheated atmosphere or from cotton piping equipment (not shown). The fan 13 then discharges atmosphere into the discharge duct 14 which contains the radiation elements 15. These radiation elements 15 may be either steam, hot water or furnace radiation surfaces, but for elimination of fire hazards the steam radiation is preferable. Control of temperature is achieved by customary use of the valve 16 regulating the heating fluid provided in the pipes 15′.

The discharge duct 14 is a substantially air-tight duct and connects to the cabinet 2 in a substantially air-tight junction at the aperture 14′. Within the cabinet 2 are disposed the baffle 19, baffle aprons 18, lower baffle box 21, and baffles 20 and 22 which extend from sides 2ᶜ to sides 2ᶜ of the cabinet 2 and form the stage chambers Q, X, Y and Z.

Baffle-aprons 18 and baffles 20 and 22 are disposed as closely as possible to the tops and bottoms of the trays 10 so that minimum leakage will be possible across the tops and bottoms of the traveling baskets or trays 10.

Cloth hammocks 12ᵃ or other flexible material 12ᵃ may be used between each pair of adjacent trays or baskets 10 to prevent dropping of seed-cotton into the lower parts of the cabinet 2 and into the lower baffle box 21 in the event that the construction of the trays 10 is not close enough to otherwise prevent leakage of cotton between the sides 10′ of said trays 10.

Referring to the operation of my dryer and the process of drying the seed-cotton it will be seen that the seed-cotton is introduced into the cabinet 2 through the cotton inlet 1 where the incoming damp seed-cotton is distributed into the traveling trays or baskets 10, said trays or baskets 10 being a part of the endless conveying assembly hereinbefore described and contained within the dryer cabinet 2. Seed-cotton is readily compressible, so that each tray 11, when filled at cotton inlet 1 is "levelled off" on top by the action of the baffle 22 beneath which the trays 11 pass.

From the cotton inlet 1 which is disposed near the end 2ᵃ of the cabinet 2 the seed-cotton is conducted in the trays 10 through the series of baffled passes between the chambers Z, Y, X and Q and toward the end 2ᵇ of the cabinet 2.

During the travel of the trays 10 from the end 2ᵃ of the cabinet to the end 2ᵇ thereof the seed-cotton is subjected to continuous penetration and direct exposure by the currents of heated atmosphere or drying medium which is delivered by the fan 13 into the duct 14 through the heaters 15 into the hot-blast mouth or aperture 14′ and thence downward into the chamber Q which is defined between the baffles 19 and 20 and the cabinet top 2ᵈ. From the chamber Q the drying medium flows through the passages or chambers X, Y and Z and through the trays as indicated by the ventilation arrows of Figure 1, the flow being in a direction generally opposite to that of the traveling trays 10 on the upper run of the conveyor assembly.

At the completion of the exposure of the seed-cotton to the drying medium the trays 10 pass beneath the baffle 19 and thence make a turn about the conveyor shaft 4 and the seed-cotton is thereby automatically dumped or discharged into the cotton outlet 3. It is immaterial whether or not this cotton outlet 3 delivers the dried seed-cotton to closed bins (not shown) or to cotton pipes (not shown) or to open wagons (not shown), because the cotton outlet 3 is an "open" outlet.

The heated atmosphere enters the chamber Q through the hot-blast mouth 14′ and then flows downward directly through the traveling trays 10 into the chamber X which is formed by the lower baffle box 21 which extends laterally between the sides 2ᶜ of the cabinet 2. Within this lower baffle box 21 the currents of the drying medium are deflected so as to pass upward directly through the traveling trays 10 into the chamber Y which is defined by the baffles 20 and 22 together with the top 2ᵈ of the dryer cabinet 2 and the traveling trays 10. Within this chamber Y the drying medium is again deflected so as to pass downward through the freshly loaded traveling trays 10 thence into the chamber Z and thence through the empty trays 10 and the spaces between the grille strips 23 to a final release into the external atmosphere. I do not reheat nor re-circulate this moisture-laden drying medium.

Heated atmosphere is employed in my dryer as the drying medium hereinbefore referred to. Atmosphere is composed of dry air and aqueous vapor in variable proportions. The aqueous vapor content of the atmosphere may be scientifically designated fractionally or by "percentage of relative humidity", which percentage is frequently as high as seventy percent relative humidity average throughout the delta cotton growing regions of the United States during the usual cotton ginning season.

By heating the atmosphere in the manner hereinbefore described, a sufficient reduction in the relative humidity is accomplished to secure a resultant drying medium which has a capacity for drying which is inversely proportional to its new relative humidity, and whose drying capacity likewise is affected by the efficiency of the drying method.

It is evident from the foregoing description of my method and apparatus that the freshly heated, dryest atmosphere contacts and penetrates the seed-cotton in its advanced stages of drying, while the moisture-laden atmosphere in its final passage from chamber Y to chamber Z makes a contact with the incoming damp seed-cotton and thus the drying medium is enabled to accomplish the most effective work.

It will also be observed that by changing the speed of travel of the endless conveyor assembly by means of reduction gearing such as shown in Patent No. 1,329,082, issued January 27, 1920, or otherwise (not shown) I secure a regulation over the length of time of exposure of the seed-cotton within the cabinet 2. Regulation of the temperature of the drying medium is preferably secured by adjustment of the heater valves 16 hereinbefore mentioned, although an increase in the speed of the fan will increase the volume of atmosphere handled by the heater 15 and this change in volume is a means of securing fluctuations in temperature.

I secure a primary control over the volume of heated atmosphere per pound of seed-cotton by the selection of size and speed of the fan 13 in accordance with known engineering data, but an important secondary control over the proportionate volume of heated atmosphere per unit of weight of seed-cotton is secured by the thickness of the layer of seed-cotton which is fed into the trays 10 at the cotton inlet 1. For wet seed-cotton, a thin layer within the trays is preferable, and when combined with a long period of exposure (not to exceed three minutes) the fan 13 operates under a reduced static pressure within the chambers Q, X, Y and Z and consequently delivers more cubic feet of atmosphere at a given rate of speed than it will with a thicker layer of the seed-cotton, each pound of seed-cotton under these regulatory conditions consequently likewise receiving more of the drying medium than it would under shorter exposure and greater thickness of layer of seed-cotton.

It will be understood that changes or modifications in the different parts of my dryer may be effected without departing from the spirit of my invention as hereinafter claimed. It will also be understood that any combinations of exposure, temperature and volume may be effected within the ranges of my process without departing from the spirit of my invention as hereinafter claimed.

In two other applications on vertical styles of seed-cotton dryers filed concurrently herewith I attain similar control over these essential features of my method of drying seed-cotton, but in each of these other applications I employ a distinctly different kind of construction and general mechanism.

I am aware that prior to my invention various cotton dryers have been made which employ heat, ventilation and horizontal traveling aprons. I do not therefore claim such a combination broadly, but

I claim:

A process of the character described for drying seed-cotton, comprising a length of time of exposure of the seed-cotton to the drying process of from forty seconds to one hundred eighty seconds, a continuous circulation of heated atmosphere at a temperature of not to exceed two hundred degrees Fahrenheit so that the exposed seed-cotton will not be heated above the seed germination danger temperature of one hundred seventy five degrees Fahrenheit, a volume of heated atmosphere per pound of seed-cotton varying from forty cubic feet to one hundred cubic feet of heated atmosphere per pound of seed-cotton, a continuous circulation of said heated atmosphere through said seed-cotton so that the incoming heated atmosphere penetrates through the seed-cotton in the last stages of its drying and so that the outgoing moisture-laden atmosphere passes through the incoming damp seed-cotton, and means of control over the length of time of exposure and temperature and volume combinations to enable a satisfactory drying of the seed-cotton under variable conditions of weather, season and seed-cotton moisture content.

CHARLES ABEL BENNETT.